O. D. DUNHAM.
Horse Rake.
No. 42,079.
Patented March 29, 1864.
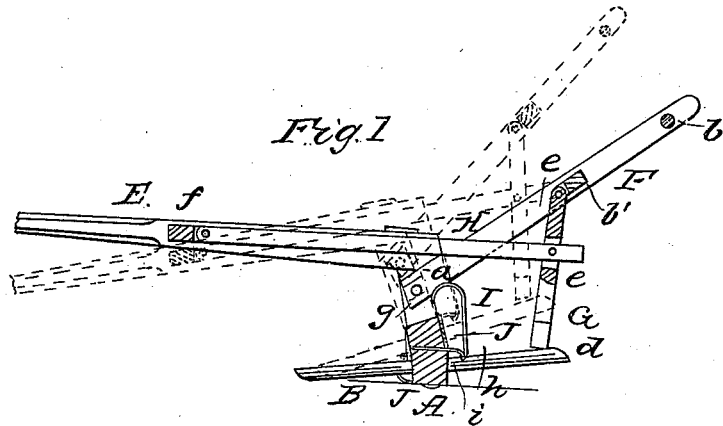
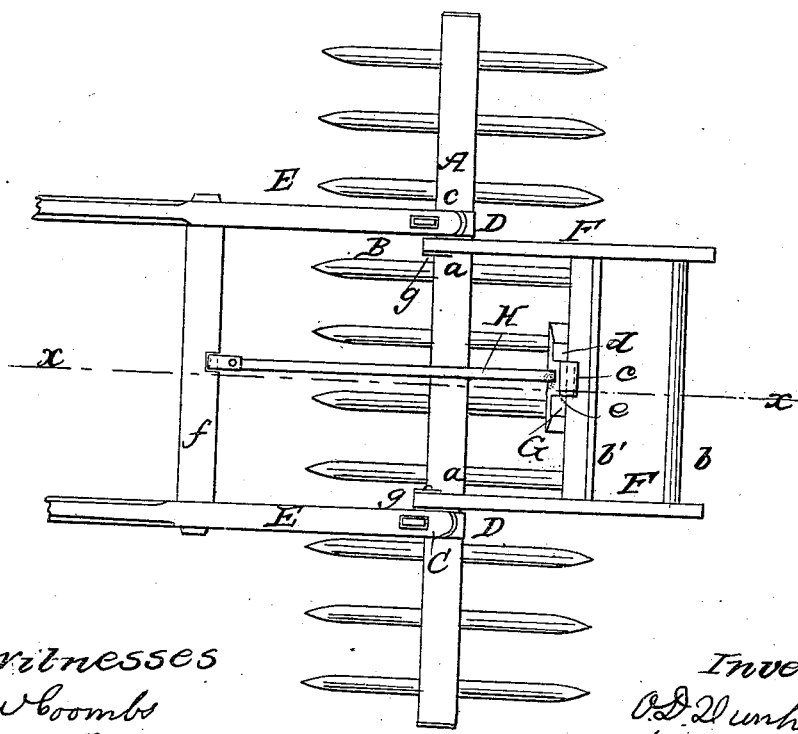

UNITED STATES PATENT OFFICE.

ORSON D. DUNHAM, OF PLAINWELL, MICHIGAN.

IMPROVEMENT IN HORSE-RAKES.

Specification forming part of Letters Patent No. 42,079, dated March 29, 1864.

*To all whom it may concern:*

Be it known that I, ORSON D. DUNHAM, of Plainwell, in the county of Allegan and State of Michigan, have invented a new and useful Improvement in Revolving Horse-Rakes; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the two figures.

This invention relates to an improvement in that class of horse-rakes which are provided with rigid straight teeth fitted in a head which is allowed to rotate in order that the rake may discharge its load.

The invention consists in the employment or use of elastic hooks attached to the handle of the implement in connection with catches attached to the rake-head, the parts being so arranged that the rake may, by a slight manipulation on the part of the attendant, be made to revolve, and its load discharged with certainty.

To enable those skilled in the art to fully understand and construct my invention, I will proceed to describe it.

A represents the head of the rake, which is constructed of wood of any suitable dimensions, and has teeth B passing transversely through it at suitable and equal distances apart, the teeth projecting at equal distances from two opposite sides of the rake-head, as shown in Fig. 2. This rake-head A has two cylindrical parts turned or formed in it to admit of being connected to the lower ends of two uprights, C C, by metal straps D D, which serve as bearings for the rake-head and admit of it turning freely. To the upper ends of the uprights C C the thills E E are attached, and to each upright C a handle, F, is attached by a pivot-bolt, *a*. These handles are connected by cross-bars $b\ b'$, and to the inner or lower cross-bar, $b'$, a treadle, G, is attached by a joint, *c*, said treadle being formed by attaching a horizontal bar, *d*, to an upright bar, *e*, the latter being connected to the cross-bar $b'$ by the joint *c*. The bar *e* is connected by a bar, H, to a cross-bar, *f*, of the thills E.

To the front or lower end of each handle F there is attached an elastic hook-bar, I. These hook-bars should be of steel, their upper ends being bent or curved so that they may be secured to the handles F by a metal clasp, *g*, and then extend down from the handles and bent at their lower ends to form hooks *h*, as shown clearly in Fig. 1.

To the upper and lower surfaces of the rake-head A, adjoining the inner sides of the uprights C C, there are attached metal bars J J, which project at one end slightly beyond the rake-head, and are curved a little downward to form catches *i* for the hooks *h* to engage with, as will be understood by referring to Fig. 1.

The operation is as follows: As the rake is drawn along the teeth B are nearly in a horizontal position, the front ends being slightly depressed in order to catch the hay and rake up the same. The treadle G prevents the rake from casually revolving in consequence of resting or being over the back part of two or more of the teeth B. When the rake is full or has a sufficient load the driver or attendant who has hold of the handles F on the outer cross-bar, *b*, thereof raises said handles, and the hooks *i* of the elastic hook-bars I, which are engaged with the bars or catches J J on the upper side of the rake-head A, will cause the rake to be tilted sufficiently so that the front ends of the teeth B will catch into the ground, and thereby cause the rake, under the draft movement, to be rotated one-half of a revolution and its load to be discharged, the treadle G being drawn back free from the rake-teeth as the handles F are raised. As the rake completes its half-revolution the hooks *i* of the bars I, by a depression of the handles F, engage with the catches J, which were previously at the under side of the rake-head, and the implement again commences its work. By this arrangement the rake may be rotated so as to discharge its load with certainty at the will of the driver or attendant, and by a very slight manipulation on his part.

I do not claim the revolving rake nor its handles, for these parts are old and well-known; but,

Having thus described my invention, what I do claim as new, and desire to secure by Letters Patent, is—

The combination, with the handles F and rake-head A, of the elastic hook-bars I and catches J, as and for the purpose herein set forth and described.

ORSON D. DUNHAM.

Witnesses:
S. B. BRIGHAM,
I. W. CRITTENDEN.